(12) United States Patent
Cooney, Jr. et al.

(10) Patent No.: US 8,209,149 B2
(45) Date of Patent: Jun. 26, 2012

(54) SYSTEM AND METHOD FOR AUTOMATICALLY CREATING DATA SETS FOR COMPLEX DATA VIA A RESPONSE DATA HANDLER

(75) Inventors: George A. Cooney, Jr., Eureka, CA (US); Richard P. Verseput, McKinleyville, CA (US)

(73) Assignee: S-Matrix, Eureka, CA (US)

( * ) Notice: Subject to any disclaimer, the term of this patent is extended or adjusted under 35 U.S.C. 154(b) by 240 days.

(21) Appl. No.: 11/932,664

(22) Filed: Oct. 31, 2007

(65) Prior Publication Data

US 2008/0109191 A1 May 8, 2008

Related U.S. Application Data

(63) Continuation-in-part of application No. 11/750,961, filed on May 18, 2007, now Pat. No. 7,613,574, and a continuation-in-part of application No. 11/434,043, filed on May 15, 2006, now Pat. No. 7,606,685, and a continuation-in-part of application No. 11/262,539, filed on Oct. 28, 2005, now Pat. No. 7,239,966.

(60) Provisional application No. 60/895,101, filed on Mar. 15, 2007.

(51) Int. Cl.
*G06F 15/00* (2006.01)
(52) U.S. Cl. .......................................... 702/189; 702/32
(58) Field of Classification Search .............. 702/22–26, 702/30–32; 700/1, 19
See application file for complete search history.

(56) References Cited

U.S. PATENT DOCUMENTS

| | | | |
|---|---|---|---|
| 4,412,288 A | 10/1983 | Herman | |
| 5,369,566 A | 11/1994 | Pfost et al. | |
| 5,419,328 A * | 5/1995 | Goh et al. | 600/443 |
| 5,959,297 A | 9/1999 | Weinberg et al. | |
| 6,004,617 A | 12/1999 | Schultz et al. | |
| 6,030,917 A | 2/2000 | Weinberg et al. | |
| 6,034,775 A | 3/2000 | McFarland et al. | |
| 6,178,382 B1 * | 1/2001 | Roederer et al. | 702/21 |
| 6,489,168 B1 | 12/2002 | Wang et al. | |
| 6,581,012 B1 | 6/2003 | Aryev et al. | |
| 6,658,429 B2 | 12/2003 | Dorsett, Jr. | |
| 6,728,641 B1 | 4/2004 | Cawse | |
| 6,754,543 B1 | 6/2004 | Wold | |
| 6,853,923 B2 | 2/2005 | Trygg et al. | |
| 6,909,974 B2 | 6/2005 | Yung et al. | |
| 6,947,953 B2 * | 9/2005 | Herzenberg et al. | 1/1 |

(Continued)

FOREIGN PATENT DOCUMENTS

WO    WO 00/52646    9/2000

(Continued)

OTHER PUBLICATIONS

Lukulay et al., "Automating HPLC and GC Analytical Method Validation", Data and Review, 5 pgs.

(Continued)

*Primary Examiner* — Manuel L Barbee
(74) *Attorney, Agent, or Firm* — Sawyer Law Group, P.C.

(57) ABSTRACT

The present invention provides a system and method for automatically generating reduced response data sets from complex scientific data via a response data handler (RDH) methodology, thereby eliminating non-systematic losses and oversights often associated with and resulting from the current practice while improving the overall integrity and confidence of the results typically sought in experimental practice.

23 Claims, 10 Drawing Sheets

U.S. PATENT DOCUMENTS

| | | |
|---|---|---|
| 6,996,550 B2 | 2/2006 | Wang et al. |
| 7,194,374 B2 | 3/2007 | Kobayashi et al. |
| 7,213,034 B2 | 5/2007 | Dorsett et al. |
| 7,427,479 B2 | 9/2008 | Karger et al. |
| 7,474,925 B2 | 1/2009 | Renner |
| 7,519,605 B2 | 4/2009 | Vailaya et al. |
| 2001/0039539 A1 | 11/2001 | Sartiel et al. |
| 2002/0156792 A1 | 10/2002 | Gombocz et al. |
| 2003/0004612 A1 | 1/2003 | Domanico et al. |
| 2003/0050763 A1 | 3/2003 | Arrit et al. |
| 2003/0149501 A1 | 8/2003 | Tuszynski |
| 2005/0026131 A1 | 2/2005 | Elzinga et al. |
| 2005/0044110 A1 | 2/2005 | Herzenberg et al. |
| 2005/0154701 A1 | 7/2005 | Parunak et al. |
| 2005/0273475 A1 | 12/2005 | Herzenberg et al. |
| 2006/0003351 A1 | 1/2006 | Karger et al. |
| 2006/0074726 A1 | 4/2006 | Forbes et al. |
| 2007/0048863 A1 | 3/2007 | Rodgers et al. |
| 2008/0137080 A1 | 6/2008 | Bodzin et al. |
| 2008/0215705 A1 | 9/2008 | Liu et al. |

FOREIGN PATENT DOCUMENTS

| | | |
|---|---|---|
| WO | 2004038602 | 5/2004 |

OTHER PUBLICATIONS

Kwangsun Yoon, "The Propagation of Errors in Multiple-attribute Decision Analysis: A Practical Approach", The Journal of the Operational Research Society, vol. 40, No. 7 (Jul. 1989), pp. 681-686.

Winton, Don. "Process Capability Studies", 1999, 16 pages.

Shabir, Ghulam. "Validation of high-performance liquid chromatography methods for pharmaceutical analysis", 2003, Journal of Chromatography, vol. 987, pp. 57-66.

"Var Tran 3.2 Tutorials: Guide to Getting Started", 2005, 32 pages.

Sematech, "Sematech qualification plan guidelines for engineering", 1995, 106 pages.

* cited by examiner

100

Experimental Run A5512-001

| Trial Run # | Time Interval | | | | | |
|---|---|---|---|---|---|---|
| | 30m | 60m | 90m | 120m | 150m | 180m |
| 1 | 1.23 | 2.25 | 3.42 | 4.72 | 5.88 | 7.10 |
| 2 | 1.45 | 2.51 | 3.84 | 5.33 | 6.63 | 7.97 |
| 3 | 1.31 | 2.14 | 3.05 | 4.00 | 4.92 | 5.70 |
| 4 | 1.53 | 2.40 | 3.30 | 4.34 | 5.27 | 5.95 |
| 5 | 1.47 | 2.47 | 3.29 | 4.15 | 5.00 | 5.72 |
| 6 | 1.58 | 2.59 | 3.64 | 4.72 | 5.85 | 6.72 |
| 7 | 1.74 | 2.57 | 3.62 | 4.64 | 5.59 | 6.55 |
| 8 | 1.74 | 2.82 | 4.18 | 5.62 | 6.80 | 7.90 |
| 9 | 1.55 | 2.49 | 3.39 | 4.39 | 5.22 | 6.02 |
| 10 | 1.78 | 2.72 | 3.70 | 4.70 | 5.56 | 6.34 |
| 11 | 1.67 | 2.54 | 3.79 | 5.27 | 6.76 | 8.09 |
| 12 | 1.83 | 2.73 | 3.95 | 5.22 | 6.38 | 7.36 |

*FIG. 2*

| Run # | Amount Response Data | | | | | | % Dissolved Response Data | | | | | |
|---|---|---|---|---|---|---|---|---|---|---|---|---|
| | T = 0 | T = 30 | T = 60 | T = 90 | T = 120 | T = 150 | T = 0 | T = 30 | T = 60 | T = 90 | T = 120 | T = 150 |
| 1 | 0 | 1.23 | 2.25 | 3.42 | 4.72 | 5.88 | 0 | 4.92 | 9.02 | 13.69 | 18.89 | 23.53 |
| 2 | 0 | 1.45 | 2.51 | 3.84 | 5.33 | 6.63 | 0 | 5.78 | 10.04 | 15.38 | 21.30 | 26.51 |
| 3 | 0 | 1.31 | 2.14 | 3.05 | 4.00 | 4.92 | 0 | 5.25 | 8.55 | 12.19 | 16.01 | 19.67 |
| 4 | 0 | 1.53 | 2.40 | 3.30 | 4.34 | 5.27 | 0 | 6.10 | 9.60 | 13.18 | 17.35 | 21.09 |
| 5 | 0 | 1.47 | 2.47 | 3.29 | 4.15 | 5.00 | 0 | 5.90 | 9.87 | 13.15 | 16.60 | 20.00 |
| 6 | 0 | 1.58 | 2.59 | 3.64 | 4.72 | 5.85 | 0 | 6.34 | 10.37 | 14.56 | 18.87 | 23.42 |
| 7 | 0 | 1.74 | 2.57 | 3.62 | 4.64 | 5.59 | 0 | 6.94 | 10.30 | 14.49 | 18.55 | 22.38 |
| 8 | 0 | 1.74 | 2.82 | 4.18 | 5.62 | 6.80 | 0 | 6.96 | 11.27 | 16.74 | 22.48 | 27.20 |
| 9 | 0 | 1.55 | 2.49 | 3.39 | 4.39 | 5.22 | 0 | 6.22 | 9.97 | 13.56 | 17.54 | 20.89 |
| 10 | 0 | 1.78 | 2.72 | 3.70 | 4.70 | 5.56 | 0 | 7.11 | 10.89 | 14.81 | 18.78 | 22.23 |
| 11 | 0 | 1.67 | 2.54 | 3.79 | 5.27 | 6.76 | 0 | 6.68 | 10.15 | 15.15 | 21.09 | 27.05 |
| 12 | 0 | 1.83 | 2.73 | 3.95 | 5.22 | 6.38 | 0 | 7.32 | 10.92 | 15.80 | 20.90 | 25.53 |
| 13 | 0 | 1.67 | 2.69 | 3.84 | 5.06 | 6.25 | 0 | 6.70 | 10.75 | 15.35 | 20.23 | 25.02 |
| 14 | 0 | 1.12 | 2.06 | 3.27 | 4.31 | 5.47 | 0 | 4.49 | 8.24 | 13.08 | 17.25 | 21.89 |
| 15 | 0 | 2.19 | 3.24 | 4.24 | 5.28 | 6.23 | 0 | 8.77 | 12.94 | 16.97 | 21.13 | 24.91 |
| 16 | 0 | 2.11 | 2.97 | 3.76 | 4.44 | 5.11 | 0 | 8.42 | 11.89 | 15.05 | 17.76 | 20.45 |
| 17 | 0 | 1.89 | 2.87 | 3.89 | 5.03 | 6.03 | 0 | 7.57 | 11.49 | 15.58 | 20.13 | 24.13 |
| 18 | 0 | 1.63 | 2.72 | 3.62 | 4.61 | 5.64 | 0 | 6.53 | 10.87 | 14.49 | 18.45 | 22.55 |
| 19 | 0 | 2.22 | 3.48 | 5.15 | 6.93 | 8.60 | 0 | 8.86 | 13.92 | 20.60 | 27.72 | 34.38 |
| 20 | 0 | 2.01 | 2.92 | 3.77 | 4.79 | 5.83 | 0 | 8.05 | 11.69 | 15.09 | 19.15 | 23.30 |
| 21 | 0 | 1.60 | 2.33 | 3.11 | 3.89 | 4.62 | 0 | 6.39 | 9.33 | 12.42 | 15.54 | 18.46 |
| 22 | 0 | 1.54 | 2.15 | 2.75 | 3.35 | 3.92 | 0 | 6.16 | 8.58 | 11.01 | 13.38 | 15.66 |
| 23 | 0 | 1.63 | 2.92 | 3.98 | 5.22 | 6.38 | 0 | 6.51 | 11.68 | 15.92 | 20.89 | 25.53 |

SYSTEM AND METHOD FOR AUTOMATICALLY CREATING DATA SETS FOR COMPLEX DATA VIA A RESPONSE DATA HANDLER

CROSS-REFERENCE TO RELATED APPLICATIONS

This application is related to priority to U.S. Provisional Application No. 60/895,101, filed Mar. 15, 2007, and entitled, "Response Data Handler"; U.S. patent application Ser. No. 11/750,961, filed May 18, 2007, entitled "System And Method For Automating Scientific And Engineering Experimentation For Deriving Surrogate Response Data"; U.S. patent application Ser. No. 11/434,043, entitled "Method and System that Optimizes Mean Process Performance and Process Robustness"; and U.S. patent application Ser. No. 11/262,539, filed Oct. 28, 2005, entitled, "System for Automating Scientific and Engineering Experimentation" and U.S. Provisional Application No. 60/895,109, filed Mar. 15, 2007, all of which are incorporated herein by reference.

FIELD OF THE INVENTION

The present invention relates generally to automating research, development, and engineering experimentation processes and work and more specifically to providing a system and method for creating usable scalar data sets via a response data handler method.

BACKGROUND OF THE INVENTION

In many research and development (R&D) experiments, an experimental trial run is carried out by a researcher who first makes changes to a process, elements of a process, or study factors of the experiment (i.e., system level). After making these changes, the researcher then obtains measurements on test samples obtained from the trial which are referred to herein as experiment results. From these experimental results, the researcher seeks typically to identify and quantify the impacts and effects of the changes that were made.

The data structure common to these types of experiments is a single resulting measurement on a single sample obtained from the trial by the researcher. This resultant may then be represented as a response value in a coordinated manner, such as in a graph for instance. Graphically, the resultant would have a single response value (i.e., "Y-axis" data value) associated with the study factor level settings (i.e., "X-axis" data values). By example and not by way of limitation, a Y-axis data value may have an associated measurement time while an X-axis data value may represent the operational setting of a processes parameter. This type of data structure enables researchers and others the ability to identify and quantify the effects of the changes to the study factors of the experiment by numerical analysis methodologies.

However, when experimental error is a concern, which is often the situation, it is desirable to test more samples to lessen influences of error. For instance, the Y-axis data are often expanded by testing more samples from the trial and/or conducting more repeat tests per trial sample. In such situations, it is typically the standard practice to "reduce" the trial Y-axis data for numerical analysis purposes to the simple form of a single Y-axis data value associated with the trial X-axis data. This reduction is routinely done by calculating the arithmetic average of the trial Y-axis data and associating the single average, or the mean value, of the Y-axis data with the X-axis data. Depending on the experiment, additional other standard reductions of Y-axis data, such as the variance or the standard deviation for instance, may be computed to provide additional information as to variations of the system in response to the study factor level settings.

However, certain types of R&D, experiments, such as those in synthetic chemistry development or drug product dosage form development (e.g. tablet or gel cap) for instance, may have trial runs where each trial run has an associated response data set consisting of multiple, intrinsically-related values.

For example, in a drug tablet development experiment, a typical critical response is the rate of drug release over time as the tablet dissolves, often referred to as the "drug release profile". Measuring the unit amount of the drug released into a solution every ten (10) minutes for twelve (12) hours as the tablet dissolves, for example, will yield seventy-two (72) time-related response values (i.e., Y-axis data values) for the trial. In this situation, the multiple Y-axis data columns representing time-based measures of a response (i.e., the 12 hour drug release profile) would need to be reduced to one or more single Y-axis data values that characterize and quantify the profile to identify and quantify the effects of the study factor changes on the critical characteristics of the profile by numerical analysis methods.

However, standard response reductions of time-related Y-axis data values associated with a trial, such as the mean value, variance, and standard deviation, do not represent the drug release profile in a meaningful way to researchers. Additionally, it is clear that more than one repeat measurement may be made at each time point or interval. Therefore, in this case for instance, the response profile data set has two levels of complexity: multiple time-related measurement points consisting of multiple test measurements at each point in time.

By further example, in drug product dosage form development experiments, often an objective of the activity is identifying the study factor settings that may result in a specific target release profile. Currently, to identify and quantify the effects of study factor changes by numerical analysis methods a researcher must manually carry out a number of complex data handling, conversion, and reduction operations to generate results, profile data and then to derive scalar response data sets appropriate to numerical analysis from the profile data.

FIG. 1 depicts a graph 100 of drug release profile data from six experiment trials conducted as part of a drug tablet development experiment. In each trial the original response data value obtained at each X-axis time point was the Amount of the drug measured in the time point sample. The graphed % Dissolved response data value associated with each time point in each time in each trial profile therefore represents a conversion of the original Amount data value into a % Dissolved data value; the conversion being necessary to construct a response profile for the trial. When more than one measurement is carried out on each time point sample obtained from a trial, the arithmetic average, or mean, of the repeat Amount measurements must first be obtained prior to conversion of the mean value into a % Dissolved data value. Thus, in this case two conversions of the original Amount data from a trial would be required in order to obtain the % Dissolved profile for the trial. Once the profile is constructed, further conversions or reductions must be carried out on the profile data to obtain one or more scalar response data sets appropriate to numerical analysis.

From the response profile data sets graphically depicted in FIG. 1, one of the responses that can be determined and depicted is percent of tablet dissolved (Y-axis data along the ordinate) versus time interval (X-axis data along the abscissa).

From FIG. 1, a particular response of interest is the percent of drug dissolved at the 120 minute time point, shown along line 110. The researcher's compilation compiled of this scalar response (single Y column) was performed with a great deal of effort by selecting the percent release (i.e., dissolved) value at 120 minutes from each trial runs' profile data set. This effort represents the simplest reduction of a response profile data set to a scalar response.

From FIG. 1, a further particular response of interest may be the drug release rate in a specific time interval such as between two and eight hours (i.e., the 120-480 minute segment of the graphed profiles) which is depicted by boxed area 120. To determine a related scalar response, a more complex reduction of the release profile data is required and is even more challenging for a researcher to undertake.

One method of attempting to resolve this issue is for the researcher to extract the 120-480 minute portion of the percent released data from each profile and then calculate the slope of the extracted data (i.e., the change in percent released divided by change in time). Researchers are often challenged in determining scalar response data sets such as this from time-related profile data sets.

In many situations, the target response profile is linear, but in many cases a non-linear (i.e., curved) profile is often desired. To obtain reductions of curved profile data, the curved target profile must first be defined.

One typical step in defining the curved target profile is to individually define the X-Y coordinate data (i.e., coordinates) corresponding to the desired curve along the X-axis interval of interest. To correctly estimate the degree of similarity of an experimentally obtained response profile to a target profile using numerical analysis techniques typically necessitates that both data sets have the same number of data values with the same X-axis coordinates. A researcher's construction of such a target profile data set is indeed quite challenging, tedious and error-prone, particularly given the large number of individual X-Y data pair values that must be defined. For example, seventy-two (72) X and Y values in the 12-hour release profile data are required as previously set forth.

In some cases though a general equation may exist that generally approximates the target profile. In such a situation, the researcher can input the X value at each measurement time point into the equation and obtain the corresponding Y value as the equation output. While this generalization may simplify the researcher's task of constructing the target profile data set, the equation must often be adjusted when its output profile differs from the target profile. This adjustment can be a challenge to the researcher as well, particularly given the need for advanced numerical analysis and equation-building skills which are typically beyond the capabilities of many practicing researchers.

Therefore, it can be and is readily determined that a visually and graphically oriented method and system for enabling the generation of reduced response data sets from complex experimental results is desired. Additionally, it is preferred that such a method and system would also properly format the data sets for numerical analysis for the researchers' use and benefit.

SUMMARY OF THE INVENTION

The present invention addresses such a need and sets forth an approach to solve these issues by employing a unique method and system for automatically generating reduced response data sets from complex scientific data via a response data handler (RDH) methodology, thereby eliminating non-systematic losses and oversights often associated with and resulting from the current practice while improving the overall integrity and confidence of the results typically sought.

In one embodiment, the present invention is a method for tracking and managing experimental results data sets comprising intrinsically-related values and reducing experimental data to analysis-ready scalar response data sets comprising: defining an operational mode; defining an experimental design for a target experimental platform (experiment design); defining a coordinated testing design that will generate test results consisting of intrinsically-related values; configuring a response data handler (RDH) in relation to predetermined performance characteristics for a plurality of experimental design runs of the experimental design; automatically obtaining experimental raw data findings from the plurality of experimental design runs; automatically converting raw data findings into results profile data sets when the intrinsic relationship prescribes; and creating one or more numerically analyzable response data sets by reducing the experimental raw data findings according to the prescription defined by the raw data's intrinsic relationship.

In another embodiment the present invention is a computer readable medium containing program instructions for tracking and managing experimental results data sets consisting of intrinsically-related values and reducing experimental data to analysis-ready scalar response data sets comprising: defining an operational mode; defining an experimental design for a target experimental platform (experiment design); defining a coordinated testing design that will generate test results consisting of intrinsically-related values; configuring a response data handler (RDH) in relation to predetermined performance characteristics for a plurality of experimental design runs of the experimental design; generating automatically obtaining experimental raw data finds from the plurality of experimental design runs; automatically converting raw data findings into results profile data sets when the intrinsic relationship prescribes; and creating one or more numerically analyzable response data sets by reducing the generated experimental findings according to the prescription defined by the raw data's intrinsic relationship.

In a further embodiment, the present invention is a system having program instructions for tracking and managing experimental results data sets comprising intrinsically-related values and reducing experimental data to analysis-ready scalar response data sets comprising: defining an operational mode; defining an experimental design for a target experimental platform (experiment design); defining a coordinated testing design that will generate test results consisting of intrinsically-related values; configuring a response data handler (RDH) in relation to predetermined performance characteristics for a plurality of experimental design runs of the experimental design; generating automatically obtaining experimental raw data findings from the plurality of experimental design runs; automatically converting raw data findings into results profile data sets when the intrinsic relationship prescribes; and creating one or more numerically analyzable response data sets by reducing the generated experimental raw data findings according to the prescription defined by the raw data's intrinsic relationship.

BRIEF DESCRIPTION OF THE DRAWINGS

FIG. 2 is an exemplary depiction of a column-row relationship for experimental information having raw results data for the present invention.

FIG. 3 depicts portions of two corresponding time-related response data sets: the first data set consists of raw Amount response data, the second data set consists of the corresponding % Dissolved response profile data obtained by converting the raw data into profile data.

FIG. 4 presents an RDH configuration in a software dialog box in a preferred embodiment of the present invention.

DETAILED DESCRIPTION

Figure 1:
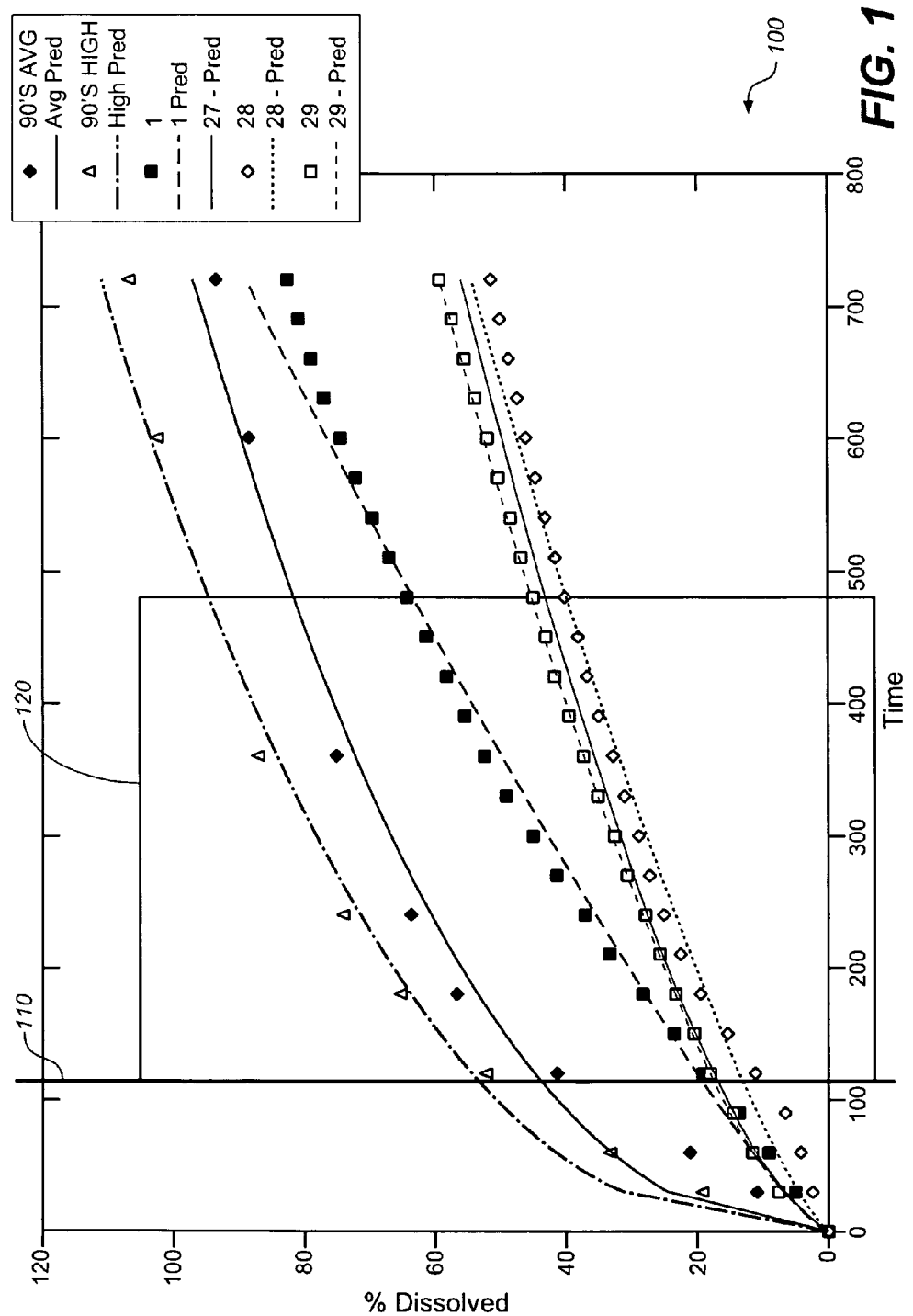
FIG. 1 depicts a graph of converted % Dissolved drug release profile data from six of the 23 experiment trials that together comprise the full response data set (time-related measurements taken at 30 minute intervals over 12 hours).

The present invention sets forth a method and system for automatically tracking, managing and generating reduced response data sets from complex scientific data via a response data handler (RDH) methodology, thereby eliminating non-systematic losses and oversights often associated with and resulting from the current practice while improving the overall integrity and confidence of the results typically sought. The present invention may preferably be implemented via software or machine-readable code instructions to rapidly and nearly transparently "reduce" intrinsically-related "raw" results data sets into analysis-ready scalar response data sets.

The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

In a preferred embodiment, the RDH dynamically configures its operating modes, user interface, and corresponding data conversion and reduction options in direct relation to the raw results data encountered.

FIG. 2 is an exemplary depiction of a column-row relationship 200 for experimental information having raw results data for the present invention. From FIG. 2, a spreadsheet-type foundation (i.e., grid) 200 contains the raw results data sets for each software-imported or user entered response (i.e., "response"). The first column of the grid 200 contains the row labels 210 of the corresponding experiment design trial runs. All subsequent column labels contain an element that designates the type of intrinsic relationship corresponding to the response data. When appropriate, the column sequence also is configured to reflect the data nature. For time-related response profile data sets the columns are sequenced left to right in order of increasing time, and each column label contains the time-based value corresponding to the measurement time point, 220.

FIG. 3 depicts portions of two corresponding time-related response data sets at 300 in grid formations. The first grid contains columns of time-related raw Amount response data 210 obtained for 23 experiment trails performed as part of a drug tablet development experiment (Amount measurements taken at consecutive 30 minute time points over the first 2.5 hour portion of a 12 hour study). The second grid contains corresponding columns of % Dissolved response profile data 220 obtained by converting the raw Amount data into profile data; the conversion being necessary to construct a response profile for each trial. Once the profile data is constructed, further conversions or reductions must be carried out on the profile data to obtain one or more scalar response data sets appropriate to numerical analysis.

Figure 4:
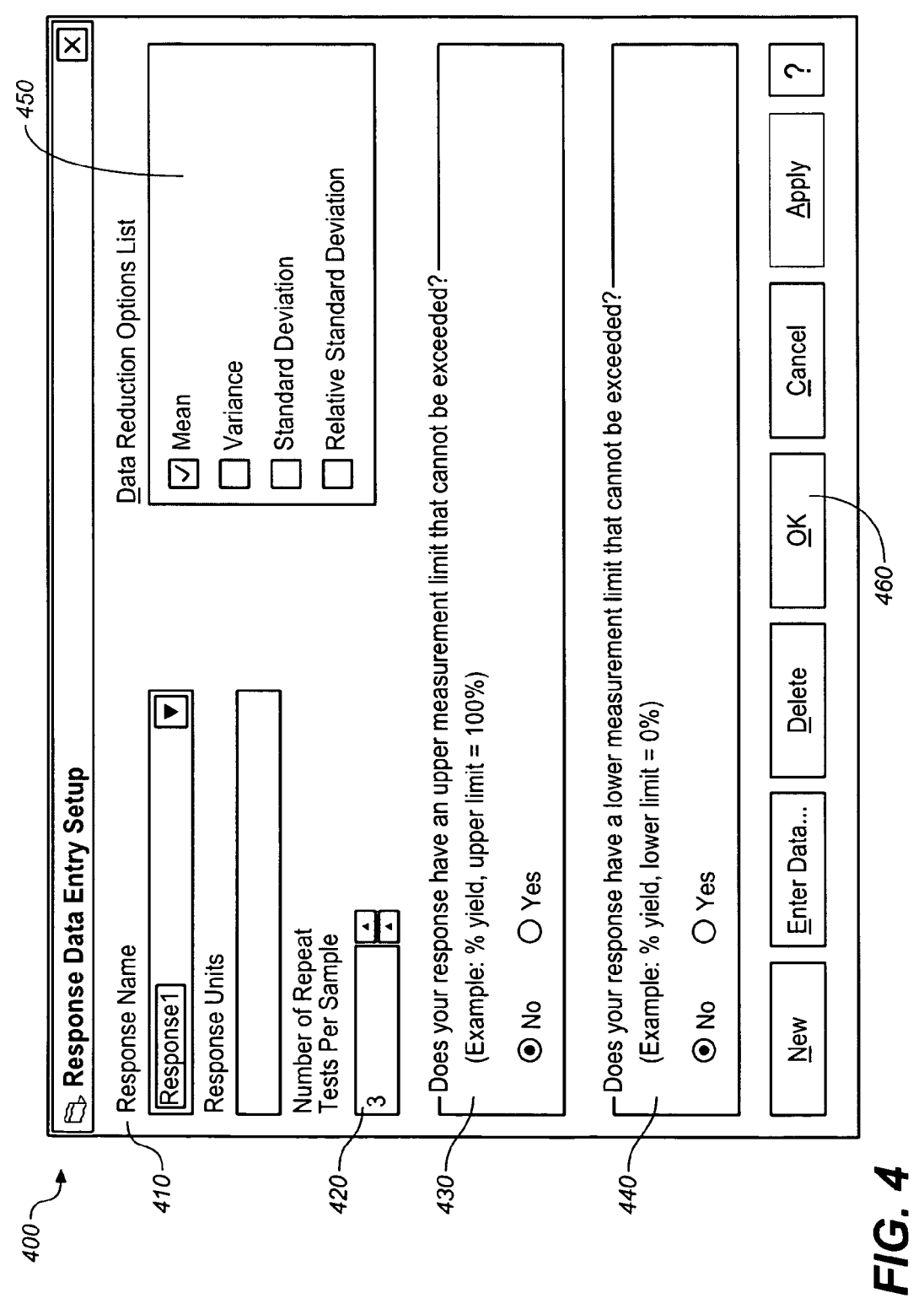

For the present invention, the RDH operating mode, user interface (RDH U/I), and data conversion and reduction options are defined by the particular experiment that is the source of the data, where the particular experiment is further defined by the software application invoking the RDH, the "active" experiment design, and the active coordinated testing design. For example, an Analytical Method Validation (AMV) application can invoke the RDH with an Analytical Capability experiment design used to study instrument variation and a coordinated testing design configured according to the intrinsic relationship of the test results to be input. In this particular case the RDH would be configured by the experiment design/testing design combination to operate on data that consist of multiple test measurement repeats carried out on samples from each trial run. FIG. 4 presents an RDH software dialog box 400 in a preferred embodiment of the present invention. The settings obtained from the dialog are used to automatically generate a testing design that is coordinated with the experiment design and configured according to the intrinsic relationship of the test results to be input. From FIG. 4, a Response Name is identified at 410, and the Number of Repeat Tests per Sample is set forth at 420. Objectives questions and answer options to the objective questions are set froth at 430 and 440. At 450, choices for Data Reductions Options are set forth. These choices at 450 are four standard statistical reductions of repeat measurement related results data. The controls for the dialogue box 400 are set forth at the bottom on the box at 460, for exemplary and illustrative purposes only as the present invention is not so limited. Similarly, it will be understood by those in the art that other types of reductions exist and that although not all have been demonstrably depicted here, the present invention is intended to include such and that any and all may be added to the functionality of the RDH simply.

Figure 5:
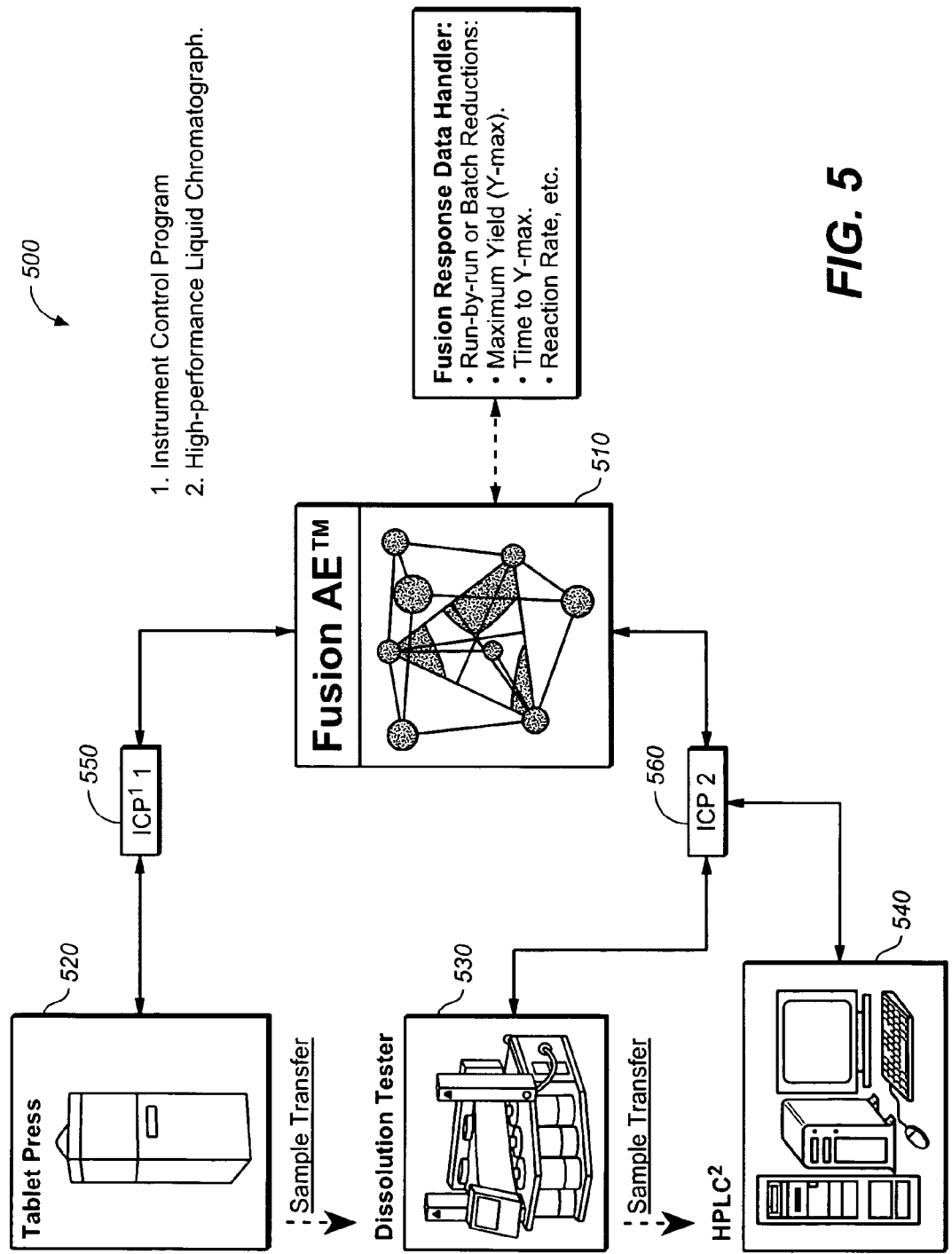
FIG. 5 presents an instrument hardware and software framework associated with the instrument systems described in an alternate embodiment of the present invention.

In an alternate embodiment, in an operational exemplar setting, a Dosage Form Development embodiment of the present invention may be employed to invoke the RDH with an Excipient Formulation experiment design used to develop and optimize the tablet product formula. In such an alternate embodiment, the experiment design target (platform on which the experiment will be conducted) is a tablet press. The tablets in the experiment are dissolved in a dissolution apparatus and samples are obtained from the apparatus at specific time intervals for testing on a high-performance liquid chromatograph (HPLC). FIG. 5 presents an instrument hardware and software framework associated with the instrument systems described in the alternate embodiment on which the experiment may be undertaken. From FIG. 5, the experiment design target is a tablet press at 520, the Fusion AE informatics software platform is at 510, the dissolution tester is at 530, the HPLC is at 540 and the respective instrument control programs (ICPs) are identified at 550 and 560 respectively. Further, in this scenario, as the RDH of the present invention would be configured to operate on data that consist of multiple time-related measurement data values carried out the trial run samples, the RDH configuration would be similar to that illustrated in the software dialog box shown in FIG. 7. This is described, for example, in U.S. patent application Ser. No. 11/750,961 entitled "System and Method for Automating Scientific and Engineering Experimentation for Deriving Surrogate Response Data."

Figure 6:
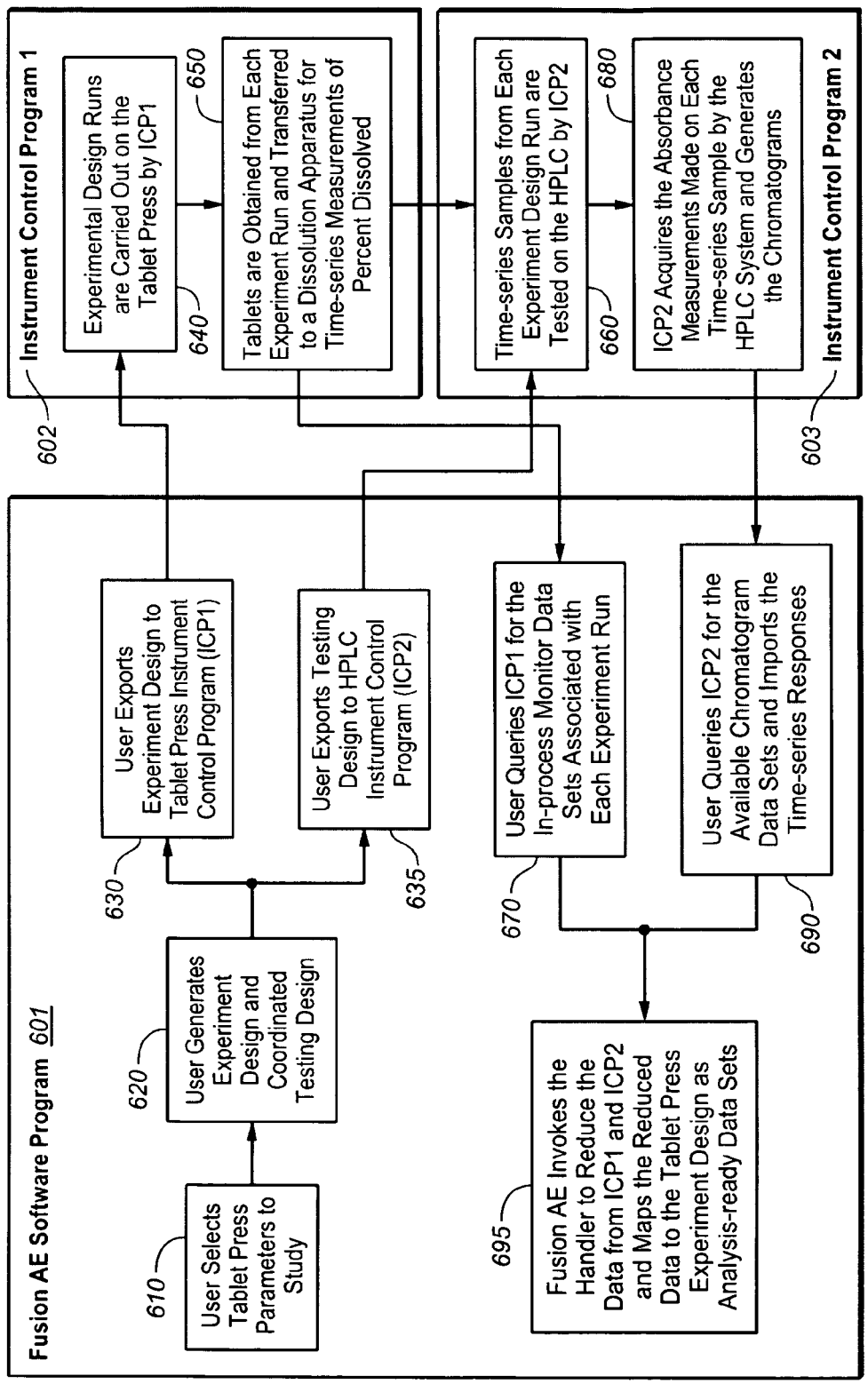
FIG. 6 presents the operational data flow of the present invention in the Dosage Form Development embodiment as executed within a Fusion AE science informatics software platform (previously set forth at 510 in FIG. 5).

FIG. 6 presents the operational data flow 600 of the present invention in the Dosage Form Development embodiment as executed within a Fusion AE informatics software platform (previously set forth at 510 in FIG. 5). In FIG. 6, Fusion AE is set forth at 601, a first ICP is set forth at 602 and a second ICP is set forth at 603. The references of FIG. 6 are intended to be read with those of FIG. 5 for the preferred embodiment of the present invention. For further reference, a Fusion AE platform can automatically compute and import Trend Response data reductions as analysis-ready scalar data sets from integrated peak data available in most chromatography data system (CDS) software and determine an optimal performance combination of the experiment study factors. This is described, for example, in U.S. patent application Ser. No. 11/750,961 entitled "System and Method for Automating Scientific and Engineering Experimentation for Deriving Surrogate Response Data."

In FIG. 6, from the process flow 600, using the software methodology of the present invention a user selects the instrument parameters to use in the experiment of interest at 610; in this case the user selects parameters associated with the tablet press. Once selected, the user then generates an Experiment Design in view of the desired experiment and trials sought at 620, along with one or more coordinated Testing Designs each of which configured according to the intrinsic relationship of the test results to be input. At 630, the user exports the Experiment Design to ICP1 of the tablet press in which the tablet press settings are electronically adjusted between trials in response to settings received from the user selected study parameters of 620. At 635, the user exports the Testing Design to ICP2 of the HPLC in which the testing strategy is configured according to the Testing Design settings of 620. At 650, the tablet press instrumentation performs the desired experiments in accordance with the predetermined settings information received from the user via the software instructions. At 660 the HPLC tests the run data of 650. At 680, the ICP2 automatically conducts absorbance measurements on each experimental trial sample and stores the measurements as raw chromatogram data. At 690, the user is able to query the ICP for the available data (i.e., raw chromatogram data) which are automatically written to a data grid within the RDH. Additionally and preferably, at 670 the in-process monitor data sets are determined. At 670, the user is able to query the ICP for the available data (i.e., in process data) which are also automatically written to a data grid within the RDH. At 695, the raw in-process monitor data sets imported from ICPI are mapped by the RDH to the tabled press experiment design as additional study factor level setting data. Also at 695, the raw chromatogram data set imported from ICP2 is converted into a profile data set and reduced to analysis-ready scalar data sets by the RDH and then the reduced data are mapped by the RDH to the tablet press experiment design as analysis-ready data sets.

Figure 7:
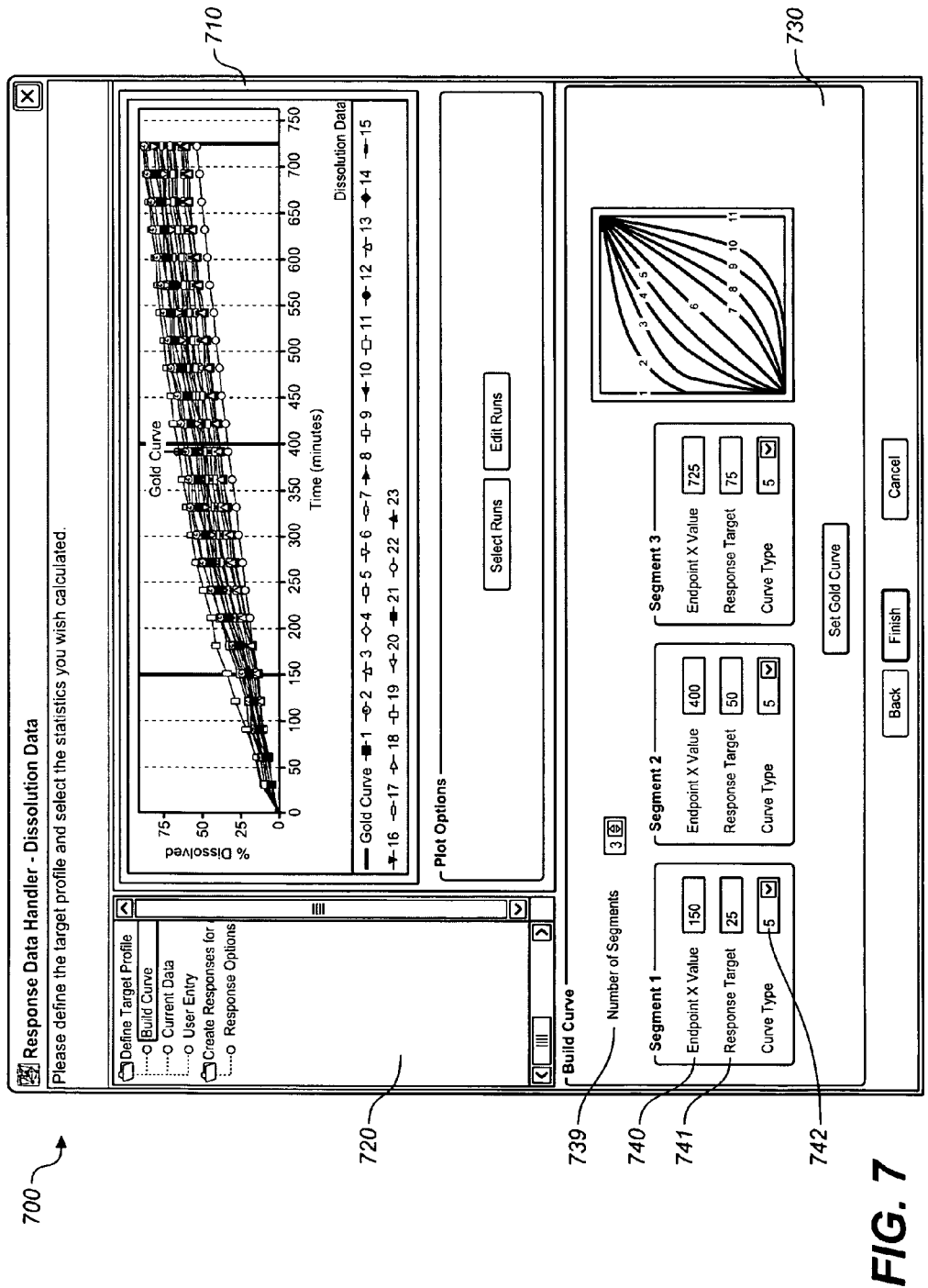
FIG. 7 is a general representation of the RDH configuration in a preferred embodiment of the present invention.

FIG. 7 is a general representation of the RDH configuration in a preferred embodiment of the present invention. From FIG. 7, the RDH user interface configuration 700 comprises three primary components: Upper Data Display 710, Tool Navigation Tree 720, and Lower Tool Display 730. The configuration shown in FIG. 7 is an arrangement for exemplary purposes only and the present invention is not necessary limited to that in content, function or arrangement as is depicted in FIG. 7.

From FIG. 7, the Upper Data Display control 710, in a preferred embodiment, generally occupies the top portion of the RDH configuration 700. The Upper Data Display panel containing the control supports the tool or tools that allow visualization of the raw response data. The Tool Navigation Tree control 720, in a preferred embodiment of the present invention, generally is positioned towards the left area of the RDH configuration 700. The Tool Navigation Tree control allows the user to navigate between operating activities and the tool options in each activity. The Lower Tool Display control panel 730, in a preferred embodiment of the present invention, generally occupies the lower portion of the RDH configuration and is generally to the right of Tool Navigation Tree control 720. The Lower Tool Display control 730 displays to a user the controls associated with the currently (i.e., active) selected activity and tool. The Lower Tool Display control 730 area may also include an Apply button or other types of control buttons to execute the tool settings on the data. The Upper Data Display control and the Lower Tool Display control portions of the RDH user interface automatically update their operating modes and corresponding control sets and configurations based on the selected Activity-Tool option.

Figure 8:
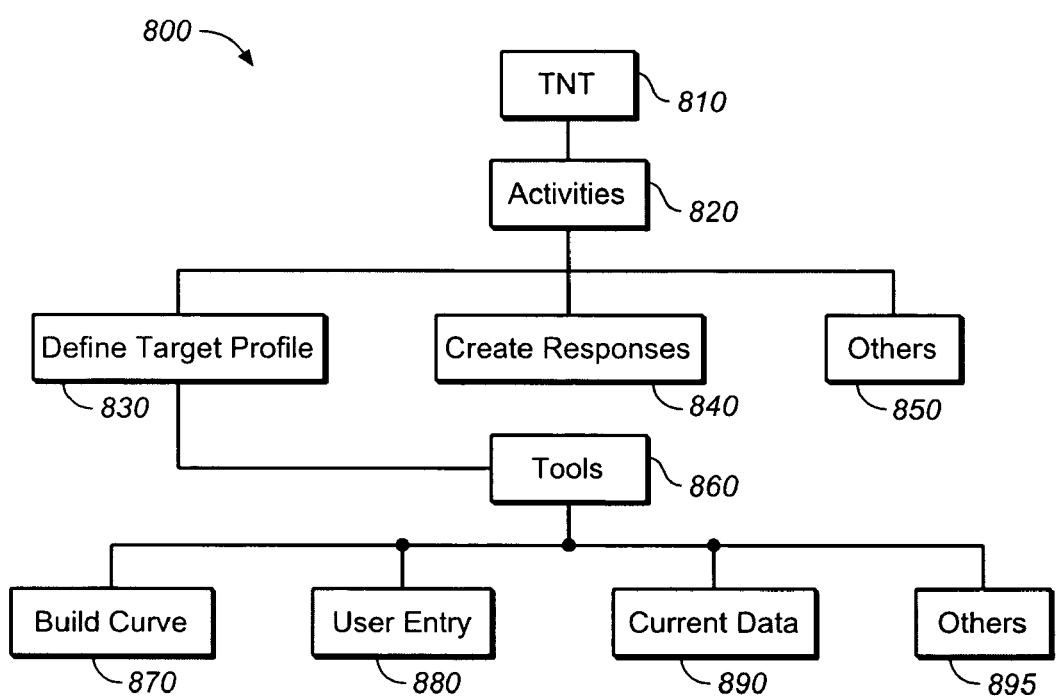
FIG. 8 is a general representation of the Tool Navigation Tree control in a preferred embodiment of the present invention (previously set forth at 720 in FIG. 7).

FIG. 8 is a general representation of the Tool Navigation Tree control in a preferred embodiment of the present invention. The Tool navigation Tree control 800 is comprised of activities 820 and related tools with each activity 860. Activities may comprise a number of variants and for exemplary purposes, FIG. 8 sets for the following activities as "Define Target Profile" (830), "Create Responses for Analysis" (840) and "Others" (850). Otherwise (850) could be, for example, as an Activity/Toolset placeholder to illustrate that other activities and/or tools that can be added in the future. These activities, the "Define Target Profile" (830), "Create Responses for Analysis" (840) and "Others" (850), are referred to as the top level activities of the Tool Navigation Tree hierarchy. Similarly, Tools 860 are associated with each activity and are arranged hierarchically to be lower than activities in the tree hierarchy. Exemplary tools in FIG. 8 are set forth in relation to the "Define Target profile" activity (830) and include but are not limited to "Build Curve" (870), "User Entry" (880), "Current Data" (890) and "Others" (895).

Pharmaceutical Process and Formulation Development experiments, Synthetic Chemistry experiments, and Stability Study experiments, for example, typically include response profile data (i.e., time-related results data sets). The response profile data are comprised of multiple time-related measurements of a response such as Percent Yield, Amount, or Percent Released, for instance, at equal intervals across a span of time. The "time series" data sets may be represented graphically as response curves. As can be viewed from FIG. 3, drug release profile data from six experiment trials done as part of a drug tablet development experiment may be visually recognized.

In the present invention the RDH performs two primary operations in the time series mode. A first primary operation is to determine the target release profile as is designated by the activity of "Define Target Profile". A second primary operation, but not necessarily required in a sequential order, is to enable the reduced data to be derived from the raw time series data sets by the activity of "Create Responses for Analysis". As part of these primary operations (i.e., activities), estimates of similarity to the target profile, slopes at a user specified time intervals, and response values at user specified measurement time points may be automatically computed, stored, singly or in combination, and mapped to the Experiment Design in a preferred embodiment of the present invention. These activities are further described below.

A. Define Target Profile Activity

Operationally, as the RDH is in the time series mode, in a preferred embodiment, a dialogue box similar to that of FIG. 7 may be employed. Additional information and selection areas may also be included such as "Available Data" and "Included Data" which may display choices available and information concerning the related trial run identification information associated with the time series data sets. Typically, for the present invention, included data will be graphically displayed. Further there are user setting controls for defining which data are to be displayed and in what manner.

In a preferred embodiment, the dynamic configuration of the RDH in the time series mode comprising two activity operations (1-Define Target Profile and 2-Create Responses for Analysis) the user enters the Define Target Profile activity and thereafter has three tools to be selected from to determine the output sought (1-Build Curve, 2-Current Data, 3-User Entry), however, others are also envisioned. Once a tool is selected from the three choices in the above preferred embodiment, the Lower Tool Display panel is then configured in response to the selected tool.

Lower Tool Display Panel—Build Curve Tool Mode

For instance, when the "Build Curve" tool mode is selected, in the Lower Tool Display area the display or panel configuration enables the user to graphically define a "Target Profile" in accordance with a series of "Overall Controls" (i.e., constituent controls or settings) including "Number of (target) Segments" and individual "Segment" controls.

The constituent control "Number of Segments" in the preferred embodiment, shown as 739 in FIG. 7, is a controller that comprises a number-entry spinner control that allows integer values between one and three, inclusive; the setting defines the number of sub-panels that are displayed to the user. Visually, the "Number of -Segments" setting divides the overall X-axis within the upper graph panel (i.e., Upper Data Display) into segments the demarcation settings of which are entered as values into the sub-panels.

Figure 9:
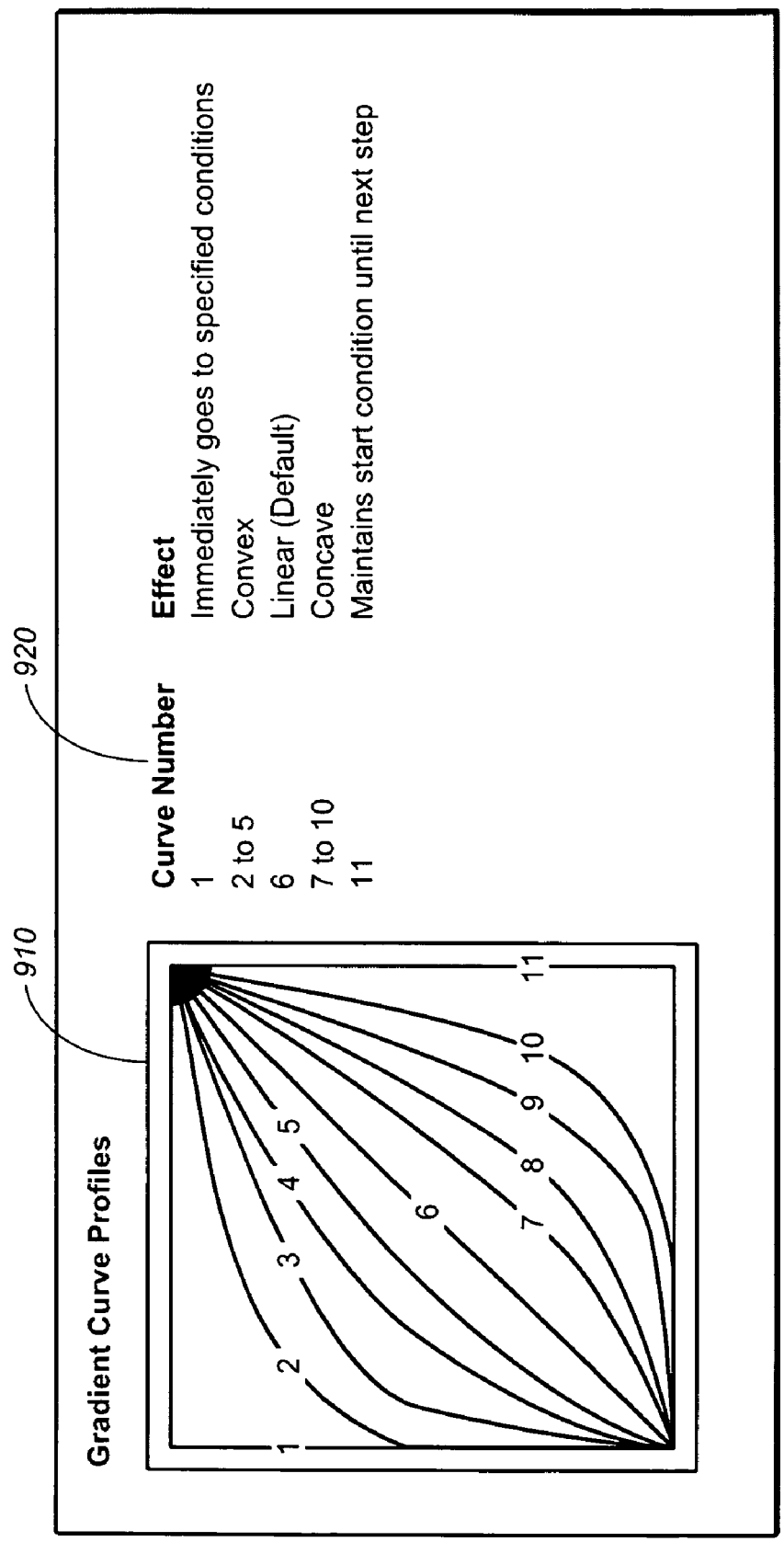
FIG. 9 is a depiction of gradient curve profiles in relation to curve numbers for an aspect of the present invention (previously set forth at 742 in FIG. 7).

The constituent control "Curve Type" in the preferred embodiment is a drop-down listbox control that indicates the corresponding curve selection chosen within a segment. The drop-down listbox contains a list of integer number values between one and 11, inclusive. The integer values correspond to the curves displayed in FIG. 9. FIG. 9 is a depiction 900 of curve profiles 910 in relation to curve numbers 920 for an aspect of the present invention.

The constituent control "Segment Controls," for a Segment 1 endpoint for instance in the preferred embodiment, is a control that is labeled as "Endpoint X Value" at 740 of FIG. 7 and comprises a number-entry text box that defines the rightmost X-axis value of Segment 1. Similarly, there is an associated background starting point X-axis value equal to the graph lower bound, where together with the rightmost X-axis value of Segment 1, the settings demarcate the X-axis range of Segment 1.

By comparison, in the preferred embodiment, the constituent control "Segment Controls", for a Segment N endpoint for instance, is a number-entry text box control that defines the rightmost X-axis value of Segment N. Similarly, there is an associated background starting point X-axis value equal to the Segment N−1 target value. As a result, the settings jointly demarcate the X-axis range of Segment N.

The number entry textboxes in the preferred embodiment should contain validation that requires (1) the entered values to be included in the current Y-axis range of the graph, (2) the upper bound of given segment to be exactly equal to the understood lower bound of the next higher segment, and (3) the upper bound to be numerically larger than the lower bound.

The controls of "Target Profile Name and Save Option Controls" [envisioned but not shown in FIG. 7] may be employed to enable a user to name and save a target profile.

An overarching aspect of the present invention in a preferred embodiment is that a user is using the segment settings to refine the selected Segment Profile in that the segment endpoint X-Y coordinates (i.e., bound settings) locate the curve on the graph control. Operationally, by "forcing" the curve through these points the user is adjusting the general curve to become a specific target profile. The user-entered endpoints (i.e., coordinates) can be regressed against the general curve equation in the background to mathematically update the background goal curve data set and thereby refine the curve display in the graph control. In this manner, the user is engaging in Target profile processing for the present invention.

Lower Tool Display Panel—Current Data Tool Mode

In accordance with a preferred embodiment of the present invention, the panel configuration for Current Data Mode enables a user to select the run label associated with one of the currently graphed data sets to be the target profile. The user is then able to set graphed line parameters associated with this profile, such as thickness and color. In the background the control then copies the selected data set as the target profile data set and graphs the curve with the Target Profile label. Optionally, controls for Target Profile Name and Save Option Controls may also be included.

Lower Tool Display Panel—User Entry Tool Mode

In accordance with a preferred embodiment of the present invention, the panel configuration for User Entry Mode enables the user to add sufficient X-Y data points to enable the control to construct and display the target profile. The user is then able to set graphed line parameters associated with this profile, such as thickness and color. In the background the control will then make the data the target profile data set and graph the curve with the Target Profile label. Optionally, controls for Target Profile Name and Save Option Controls may also be included.

B. Create Responses for Analysis Activity

Create Responses for Analysis is a second primary operation of the RDH in the Time Series mode in a preferred embodiment of the present invention. In the "Create Responses for Analysis" activity, the reduced data to be derived from the raw time-series data sets are determined. These include, but are not limited to, estimates of similarity to the target profile, slopes at a user specified time intervals, and response values at user specified measurement time points. The dynamic configuration of the RDH in the time series mode is further described below. The RDH can be configured to display controls for any of a number of other response data reductions not otherwise shown or set forth herein.

Lower Tool Display—Response Options Tool Mode

Figure 10:
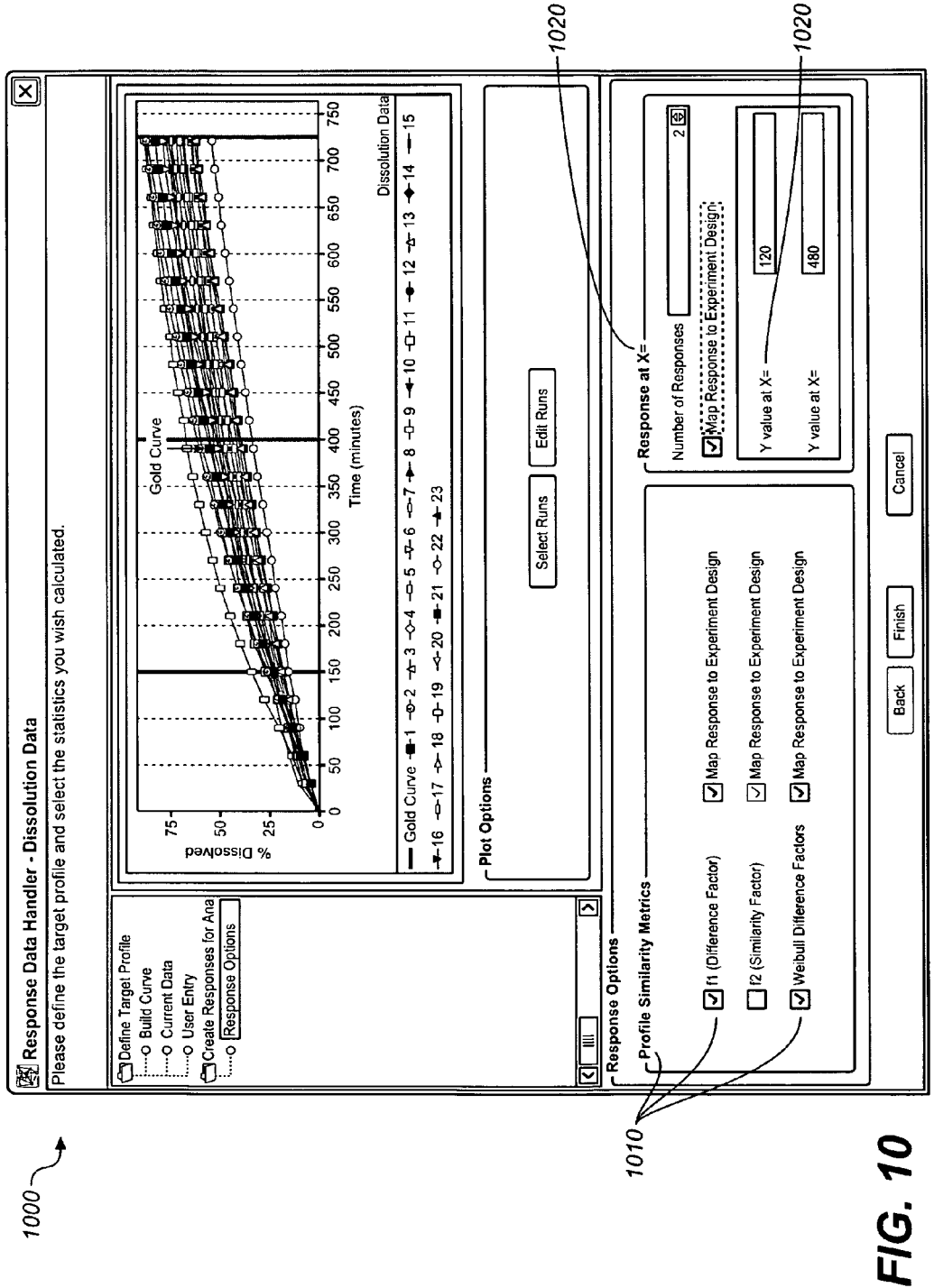
FIG. 10 is a general representation of the RDH in a preferred embodiment of the present invention in the Response Options Mode configuration 1000.

In a preferred embodiment, the dynamic configuration of the RDH in the time series mode contains a Lower Tool Display panel with predetermined tools to be selected from to determine the output sought. In a preferred embodiment, there are two tools available which are defined as "Profile Similarity Metrics" and "Response at X=". Once the Response Options tool is selected in the above preferred embodiment, the Lower Tool Display panel is then configured in response to the selected tool as is further described below. FIG. 10 is a general representation of the RDH in a preferred embodiment of the present invention in the Response Options Mode configuration 1000. The RDH provides a Profile Similarity Metrics control panel that contains selection checkboxes for the profile curve comparison options such as f1 and f2 similarities 1010. The RDH also provides a panel that contains the following controls for the "Response at X=" controls-1020: "Number of Responses" and "Response at X=". A textbox with an associated spinner control that only accepts integer values greater than zero is provided at the "Number of Responses" control. A textbox that only accepts values between the lowest and highest values of X inclusive associated with the graphed profile data contained in the Upper Data Display would be presented at the Response at X=" location. There are a number of textboxes equal to the number defined in the "Number of Responses" control. A "Generate Responses" command button would also be available in the preferred embodiment which would enable a user to execute the operations that generate the analysis-ready scalar response data sets and create standard Fusion AE response objects containing these data sets, along with checkbox controls associated with each response option that will write the generated response data sets to the Experiment Design matrix as analysis-ready scalar response that are correctly mapped to the design matrix.

The present invention may also be used as machine instructions or program code.

As is used herein, the terms "settings," "instrument parameters," "HPLC settings," "predetermined settings," "software instructions," and "data" may include but are not limited to controllable settings and study factor settings as used throughout and herein. Such terms may reference compound choices, selective blends, proportional aspects of select characteristics, feed rates, temperature gradients, and any controllable element of a process step in view of settable characteristics of instrumentation, hardware and/or software associated with the experiment.

As is used herein, the terms "researcher," "engineer," "scientist," "experimenter," "tester," "trialist," and the like, may include but are not limited to those who may engage in trial runs, sampling or other experiment methods where data are collected in any fashion.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A computer implemented method for configuring and executing an automated series of numerical procedures on source data which do not have the structure and content required for a planned statistical or numerical analysis procedure, wherein the computer performs the following functions comprising:
generating source data, wherein the source data includes raw experimental data;
automatically writing the source data to a data grid within a response data handler (RDH), wherein the RDH includes data conversion tools corresponding to operational modes and one or more numerical operations;
defining an operational mode of the RDH in relation to the source data;
dynamically configuring the RDH in relation to one or more traits of the planned statistical or numerical analysis procedure to transform the source data into analysis-ready data sets by applying the one or more numerical operations to reduce the source data and mapping the reduced source data to an experimental design, wherein the analysis-ready data sets have the correct structure and content for the planned statistical or numerical analysis procedure; and
displaying the analysis-ready data sets on a computer-generated display.

2. The method of claim 1 wherein the displaying is in one of a visual format or a graphical format.

3. The method of claim 1, wherein the method is automatic following its instantiation.

4. The method claim 1, further comprising obtaining the raw experimental data from a plurality of trials.

5. The method claim 4, wherein one of plurality of trials is one of an experiment, a test, or a comparative event evaluating one or more response values in relation to one or more study factor settings in a predetermined process.

6. The method of claim 4, wherein the RDH includes an operational mode, a user interface, and a data conversion and reduction option corresponding to the operational mode.

7. The method of claim 6, wherein the operational mode is received by the RDH from a testing design corresponding to the experimental design, and raw experimental data from the plurality of trials are received as automatically imported or user entered responses to the testing design, and the analysis-ready data sets are thereafter created in relation to the dynamically configured RDH.

8. The method of claim 7, wherein the raw experimental data includes one or more multiple intrinsically-related values, and the analysis-ready data sets are reduced numerical analysis-ready response data sets.

9. The method of claim 1, further comprising configuring a testing design generator (TDG) which is dynamic and further includes initiating an activity and one or more tools associated with the activity.

10. The method of claim 9, wherein the TDG includes dynamically configurable modes and options for generating one or more testing designs coordinated with the plurality of trials for recording raw test results in relation to one or more traits of a measurement system and a testing approach.

11. The method of claim 9, wherein the TDG includes an operational mode, a user interface, and a data recording option.

12. The method of claim 1, wherein dynamically configuring the RDH includes initiating an activity and one or more tools associated with the activity.

13. The method of claim 12, wherein the activity includes dynamically configurable settings options for generating testing designs coordinated with the plurality of trials.

14. The method of claim 12, wherein the activity includes dynamically configurable settings options for reducing the raw experimental data to the analysis-ready data sets.

15. The method of claim 12, wherein the one or more tools include one or more functionally of Build Curve, Current Data and User Entry.

16. A non-transitory computer readable medium containing program instructions executable on a computer for reducing source data into analysis-ready data sets, wherein the computer performs the following functions comprising:

generating source data, wherein the source data includes raw experimental data;

automatically writing the source data to a data grid within a response data handler (RDH), wherein the RDH includes data conversion tools corresponding to operational modes and one or more numerical operations;

defining an operational mode of the RDH in relation to the source data;

dynamically configuring the RDH in relation to one or more traits of the planned statistical or numerical analysis procedure to transform the source data into analysis-ready data sets by applying the one or more numerical operations to reduce the source data and mapping the reduced source data to an experimental design, wherein the analysis-ready data sets have the correct structure and content for the planned statistical or numerical analysis procedure; and displaying the analysis-ready data sets on a computer-generated display.

17. The medium of claim 16, wherein the method is automatic following its instantiation.

18. The medium of claim 16, wherein configuring the RDH includes initiating an activity and one or more tools associated with the activity.

19. The medium of claim 18, wherein the activity includes dynamically configurable settings options for reducing the raw experimental data to the analysis-ready data sets.

20. The medium of claim 18, wherein at least one of the one or more data conversion tools provides functionality for a user to define a target data profile graphically, to select a trial associated with a graphed data set to be a target profile, or to add sufficient data points to construct and display a target profile.

21. The medium of claim 18, wherein the one or more tools include one or more functionally of Build Curve, Current Data and User Entry.

22. The medium of claim 16 wherein the RDH is dynamically configurable in relation to one or more traits of a testing design selectable by or predetermined by a user.

23. The medium of claim 16, further comprising configuring a testing design generator (TDG) in relation to one or more traits of a measurement system and a testing approach, wherein the TDG includes at least one of dynamically configurable modes or settings options which generate one or more testing designs coordinated with a plurality of trials, wherein the modes and settings options are dynamically configured by the TDG in relation to one or more traits of the measurement system and the testing approach.

* * * * *